(12) United States Patent
Gontermann et al.

(10) Patent No.: US 9,654,030 B2
(45) Date of Patent: May 16, 2017

(54) METHOD FOR STARTING A VARIABLE-SPEED ELECTRIC MOTOR

(71) Applicant: KSB Aktiengesellschaft, Frankenthal (DE)

(72) Inventors: Daniel Gontermann, Frankenthal (DE); Jochen Schaab, Frankenthal (DE); Joachim Schullerer, Frankenthal (DE); Manfred Oesterle, Frankenthal (DE)

(73) Assignee: KSB Aktiengesellschaft, Frankenthal (DE)

( * ) Notice: Subject to any disclaimer, the term of this patent is extended or adjusted under 35 U.S.C. 154(b) by 0 days.

(21) Appl. No.: 14/782,035

(22) PCT Filed: Dec. 6, 2013

(86) PCT No.: PCT/EP2013/075810
§ 371 (c)(1),
(2) Date: Oct. 2, 2015

(87) PCT Pub. No.: WO2014/161614
PCT Pub. Date: Oct. 9, 2014

(65) Prior Publication Data
US 2016/0036356 A1   Feb. 4, 2016

(30) Foreign Application Priority Data

Apr. 5, 2013 (DE) .................. 10 2013 206 029

(51) Int. Cl.
*H02P 1/04* (2006.01)
*H02P 6/08* (2016.01)
*H02P 21/00* (2016.01)

(52) U.S. Cl.
CPC ............... *H02P 1/04* (2013.01); *H02P 6/08* (2013.01); *H02P 21/00* (2013.01)

(58) Field of Classification Search
CPC ......................................................... H02P 1/04
(Continued)

(56) References Cited

U.S. PATENT DOCUMENTS 4,516,915 A     5/1985   Jensen et al.
5,258,695 A *  11/1993   Utenick ............ G11B 19/2009
                                              318/400.04
(Continued)

FOREIGN PATENT DOCUMENTS

DE         32 10 761 C1    9/1983
DE         101 33 861 A1   2/2003
(Continued)

OTHER PUBLICATIONS

International Preliminary Report on Patentability (PCT/IB/373) issued in PCT Application No. PCT/EP2013/075810 dated Oct. 6, 2015 including English translation of document C2 (German-language Written Opinion (PCT/ISA/237) previously filed on Oct. 2, 2015 (Five (5) pages).

(Continued)

*Primary Examiner* — David S Luo
(74) *Attorney, Agent, or Firm* — Crowell & Moring LLP

(57) ABSTRACT

The invention relates to a method for starting a variable-speed electric motor, wherein upon detection of locking of the motor shaft a positive torque is applied to the motor shaft, and wherein the positive torque is continuously modified with different frequencies to overcome the locking.

13 Claims, 1 Drawing Sheet

(58) Field of Classification Search
USPC .................................................. 318/431, 430
See application file for complete search history.

(56) References Cited

U.S. PATENT DOCUMENTS

| | | | | |
|---|---|---|---|---|
| 5,563,490 | A * | 10/1996 | Kawaguchi | ......... F04D 15/0066 |
| | | | | 318/808 |
| 6,563,286 | B2 * | 5/2003 | Seki | .......................... H02P 6/22 |
| | | | | 318/431 |
| 6,586,898 | B2 * | 7/2003 | King | ........................ H02P 6/182 |
| | | | | 318/400.04 |
| 2008/0157710 | A1 | 7/2008 | Tobari et al. | |
| 2008/0297081 | A1 | 12/2008 | Morita et al. | |

FOREIGN PATENT DOCUMENTS

| | | |
|---|---|---|
| DE | 10 2007 061 917 A1 | 8/2008 |
| DE | 10 2008 025 706 A1 | 1/2009 |
| DE | 10 2008 029 910 A1 | 12/2009 |
| DE | 10 2010 040 766 A1 | 3/2012 |
| EP | 0 771 065 B1 | 1/2000 |
| EP | 1 670 134 A1 | 6/2006 |

OTHER PUBLICATIONS

International Search Report (PCT/ISA/210) issued in PCT Application No. PCT/EP2013/075810 dated Sep. 5, 2014 with English-language translation (five (5) pages).

German-language Written Opinion (PCT/ISA/237) issued in PCT Application No. PCT/EP2013/075810 dated Sep. 5, 2014 (four (4) pages).

German Office Action issued in counterpart German Application No. DE 10 2013 206 029.7 dated Jun. 6, 2013 (five (5) pages).

\* cited by examiner

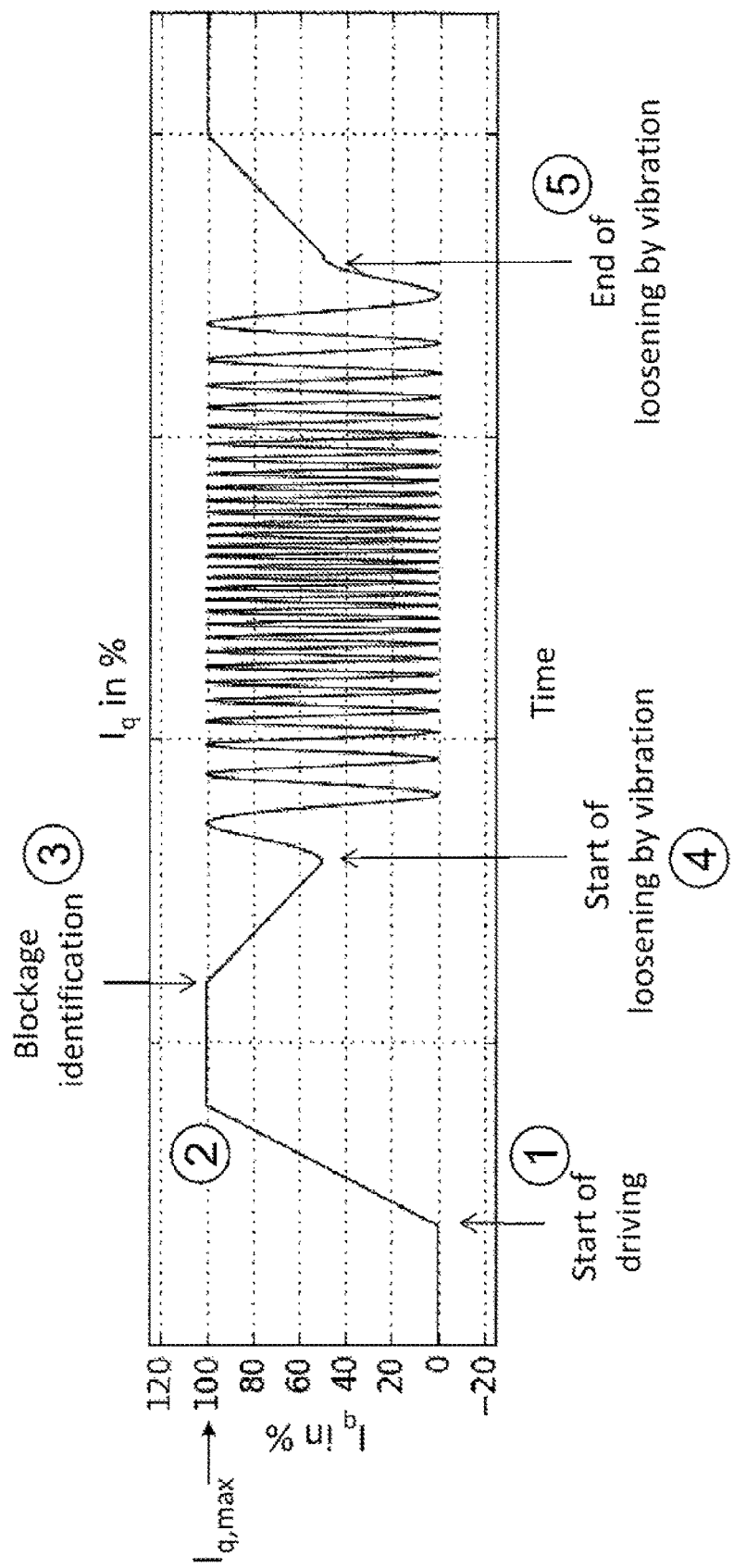

METHOD FOR STARTING A VARIABLE-SPEED ELECTRIC MOTOR

BACKGROUND AND SUMMARY OF THE INVENTION

The present invention relates to a method for starting a variable-speed electric motor, in particular a synchronous or asynchronous motor, and to an electric motor, in particular a synchronous or asynchronous motor, itself Various drives or machines have an electric motor which performs the drive work required for the operation of the machine. Under certain operating conditions, a blockage of the drive train can occur owing to impurities. This problem often occurs in electrically operated pump systems since the delivered volume flows flush impurities into the pump or motor housing, which can then result in a blockage of the pump or motor shaft.

Often, blocked pumps or drives are dismantled and cleaned in order to ensure continued operation. A further possibility consists in releasing the blockage by the mechanical action of force on the shaft of the motor or the working machine or to reduce the required runup torque. For example, DE 3210761 C1 recommends breaking free the shaft with a screwdriver in the event of a shaft blockage.

EP 0771065 B1 proposes a method for identifying a blockage of a pump impellor or the shaft of any desired drive. If the required runup current of the motor exceeds a fixed limit value, a blockage of the shaft is assumed. In this case, a maximum runup torque with an alternating direction of rotation, i.e. a maximum positive or negative runup torque, is intended to be applied to the drive. One disadvantage with this method, however, consists in that the drive can run off temporarily in the reverse running direction if the blockage is overcome during the application of a negative runup torque.

The object of the present invention therefore consists in developing known methods for starting an electric motor which can overcome the abovementioned problem.

This object is achieved by a method for starting a variable-speed electric motor is proposed. The specific embodiment of the electric motor is as desired, and therefore said electric motor can be in the form of a single-phase or polyphase synchronous motor, in particular a synchronous reluctance motor, for example. The only condition is the integration of an adjustment means for setting the motor speed. For example, the speed can be controlled by a frequency converter. Therefore, the method can likewise be implemented on asynchronous motors having a frequency converter.

The method according to the invention envisages, in a first method step, that a blockage of the motor shaft is identified reliably on the basis of specific operating conditions. If a blockage of the motor shaft is established, said motor shaft is excited by a positive torque. In this case, a positive torque is understood to mean the torque which effects a rotary movement in the desired motor direction. In contrast, a negative torque is understood to mean the rotary movement of the shaft in the rearward direction.

In accordance with the invention, provision is now made for the applied positive torque to experience continuous changes, wherein these continuous changes are performed at a different frequency in order to achieve breaking-free of the blockage. The continuous application of a positive torque is essential to the invention. Owing to the continuous variable-frequency change in the torque, breaking-free of the fixed drive shaft can be achieved owing to the use of so-called resonance effects. As a result, in comparison with the methods known from the prior art, it is possible to avoid a situation whereby the motor under certain circumstances runs off in the reverse direction during breaking-free of the rotor shaft.

The operation of the electric motor, in particular of the synchronous motor, is controlled by the applied coil voltage or the coil current which is flowing through the motor windings of the motor stator. Depending on the number of phases used, correspondingly a plurality of coil currents need to be regulated by changing the coil voltage. Preferably, the individual coil currents can be transferred into a rotor coordinate system with a d and q axis. The d axis extends in the direction of the field which is generated by the rotor itself. The q axis crosses the d axis perpendicularly in the plane of the rotor rotation.

In accordance with a particularly preferred variant embodiment of the invention, the excitation of the motor shaft with a positive torque is regulated via the current component $I_q$ along the q axis.

Particularly preferably, the electric motor, in particular a synchronous motor, is regulated to a constant value for the current component $I_q$. Ideally, half the value $I_q/2$ of the maximum current $I_q$ along the q axis is used as the constant value. An oscillation, preferably a periodic oscillation, is then superimposed on this constant value in order to achieve a continuous change in the positive torque for breaking-free of the blockage. In this case, the amplitude is selected such that a positive torque is always present at the motor shaft.

A sine function or cosine function or any other periodic oscillation has proven to be a suitable oscillation function, in particular a periodic oscillation function.

In order to achieve a resonance effect which can accelerate breaking-free of the fixed rotor, the frequency of the oscillation being superimposed is preferably varied. Accordingly, not only the change in the torque is varied, but also the speed of the change is varied. This results in an optimized loosening-by-vibration function, which, building on resonance effects, effects an efficient and quick elimination of the blockade.

Ideally, the frequency is varied within a frequency corridor with a minimum and maximum frequency. The variation can be performed in discrete steps or else in continuous steps.

It is possible for an oscillation which has a variable amplitude profile to be superimposed on the constant value of the current component $I_q$. The use of an oscillation with a constant amplitude is preferred, however. Ideally, the amplitude of the superimposed oscillation used is less than or equal to half the maximum value of the current component $I_q$. Therefore, the direction of action of the current component does not change, with the result that a positive torque is always present.

As soon as a release of the blockage is identified, it is expedient to reduce the amplitude of the oscillation being superimposed to zero. In this case, the motor operation is continued first with the constant half-maximum value of the current component $I_q$ and is increased stepwise if required until the desired motor speed is set.

The method according to the invention is particularly suitable for use in synchronous motors which provide sensorless measurement of the electrical angle, in particular synchronous reluctance motors. In this case, the electrical angle is understood to mean the angle of the magnetic field strength distribution of the rotor, i.e. of the d axis with respect to the exciting coil phase. The electrical angle is generally calculated on the basis of the current components along the q and d axis.

Using the calculated electrical angle, in a particularly preferred configuration of the invention it is possible to conclude in respect of a possible blockage of the rotor shaft. In particular, a blockage of the rotor shaft is assumed by the controller if the difference in the angular position of a present sampling step and a previous sampling step does not exceed a specific limit value. For example, the change in angle between two sampling times does not show a difference or only shows a negligibly small difference value. If the synchronous machine does not experience any change in the electrical angle, it can be concluded that there is a fixed rotor shaft owing to the lack of rotational movement. This can form a first necessary criterion for the blockage.

In addition, the development of the current component $I_q$ can be used as the second necessary criterium.

If both of these criteria are met at the same time, a blockage is identified. If the calculated current component $I_q$ reaches or exceeds a maximum value and the change in angle is below a limit threshold, it should be concluded that there is a fixed rotor shaft.

The invention furthermore relates to an electric motor, in particular a synchronous motor or an asynchronous motor, comprising a motor controller for implementing the method according to the invention or for implementing one of the advantageous variant embodiments of the method according to the invention. The electric motor, in particular a synchronous motor or asynchronous motor, is preferably provided with a frequency converter, which permits a change in speed during motor operation. In addition, the electric motor is expediently embodied as a sensorless motor, which calculates the present angle of the rotor for optimization of the coil voltage. Expediently, the electric motor is in the form of a synchronous reluctance motor. The advantages and properties of the electric motor obviously correspond to those of the method according to the invention or of an advantageous configuration of the method, for which reason no repetition of the description is provided at this juncture.

In addition, the invention relates to a pump, in particular a centrifugal pump, which is driven via an electric motor in accordance with the present invention. Obviously, the advantages and properties of the pump according to the invention correspond to those of the electric motor according to the invention or of an advantageous configuration of the electric motor.

BRIEF DESCRIPTION OF THE DRAWING

The FIGURE is a graph illustrating electric motor control in accordance with an embodiment of the invention.

DETAILED DESCRIPTION

The FIGURE shows a graph showing the profile of the current component $I_q$ of a synchronous machine along the q axis over time. As has already been described above, the current component $I_q$ represents the coil current transferred into a rotor coordinate system with the axes q and d. The current component $I_q$ can therefore be interpreted as a torque-forming current and can therefore be equated with the torque present at the rotor shaft.

For the variation of the applied torque, the synchronous machine comprises a control unit, which, using a frequency converter, enables current-regulated operation of the three-phase synchronous motor. The speed of the motor can be set precisely by means of the frequency converter.

With this drive technology, the angular position of the rotor is determined in order to be able to orientate the magnetic field of the stator correspondingly, as a result of which optimum running properties of the rotor are produced. However, the synchronous motor does not comprise a sensor system for direct detection of the present electrical angle, but this can be calculated on the basis of the measured coil currents.

On the basis of this angular position determined without the use of sensors, in addition a blockage can be identified reliably with the aid of the following condition:

$$(I_q \geq I_{q,max}) \text{ AND } (\phi_{old} - \phi_{new} < \Delta\phi),$$

where $I_q$ represents the current component along the q axis of the rotor coordinate system, $I_{q,max}$ represents the maximum permissible current component along the q axis, $\phi_{new}$ represents the present angular position of the rotor in the present sampling step, $\phi_{old}$ represents the angular position of the previous sampling step, and $\Delta\phi$ represents a threshold value of the angular position.

If this condition is met once during runup of the drive or is met permanently or predominantly over a certain time span, a blockage of the drive shaft is assumed by the controller of the synchronous motor.

In this case, the loosening-by-vibration function is started with broadband excitation. For this purpose, the current component along the q axis is reduced to half its maximum value. This procedure is illustrated in the illustration in the graph. At time 1, the operation of the synchronous motor is started, as a result of which a coil current or a current flows along the q axis. At time 2, the value of the current component $I_q$ reaches the maximum current $I_{q,max}$ along the q axis. After this time, the abovementioned condition is met. For the detection of a blockage, however, the condition needs to be met at least over the time period from time 2 to time 3.

At time 3, the current component along the q axis is then halved to half the maximum value, i.e. 50%. In addition, at time 4, a periodic oscillation with a constant amplitude is superimposed on the constant component $I_{q,max}/2$. In the exemplary embodiment shown in the FIGURE, in this case a sinusoidal oscillation is superimposed which has an amplitude which corresponds to half the maximum value $I_{q,max}/2$ of the current component $I_q$. As a result, a sinusoidal profile of the current component $I_q$ is produced by the superimposed oscillation, said profile always assuming positive values.

Reliable loosening by vibration is achieved by virtue of the frequency of the sinusoidal oscillation being varied continuously between a minimum frequency $f_{min}$ and a maximum frequency $f_{max}$. As a result, the drive train is excited at different frequencies, i.e. in broadband fashion, as a result of which resonance effects are brought about in a targeted manner and breaking-free of the fixed drive shaft is achieved.

As soon as the condition of the blockage is no longer met, the amplitude of the drive frequency is reduced quickly to zero and the drive runs free in the desired direction, as illustrated at time 5. After this time, the setpoint speed of the synchronous machine is increased continuously, as a result of which the current component $I_q$ also increases in the direction of its maximum value $I_{q,max}$.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for starting a variable-speed electric motor controlled by a controller, having the following method steps:
   monitoring at least one parameter indicative of motor operation with the controller;
   identifying a blockage of a motor shaft of the motor when the controller determines the at least one parameter is equal to or greater than a predetermined parameter threshold value; and
   exciting the motor shaft with a positive torque in response an output of the controller,
   wherein the positive torque excitation varies in frequency while the motor shaft blockage is present,
   wherein the positive torque excitation is controlled by control of a current component $I_q$ relative to a q axis of a d-q coordinate axis system of a rotor of the motor.

2. The method as claimed in claim 1, wherein the positive torque excitation varies in frequency varies as a function of an oscillation imposed on a constant current value that is one-half of a maximum value of the current component $I_q$.

3. The method as claimed in claim 2, wherein the positive torque oscillation is a periodic oscillation.

4. The method as claimed in claim 3, wherein the periodic oscillation is a sinusoidal oscillation.

5. The method as claimed in claim 4, wherein the frequency is varied continuously between a predetermined minimum frequency and a predetermined maximum frequency.

6. The method as claimed in claim 5, wherein an amplitude of the positive torque oscillation is constant.

7. The method as claimed in claim 6, wherein the amplitude of the positive torque oscillation less than or equal to one-half of the maximum value of the current component $I_q$.

8. The method as claimed in claim 7, further comprising the steps of:
   identifying the blockage of a motor shaft is no longer present when the controller determines the at least one parameter no longer exceeds the predetermined parameter threshold value; and
   reducing the amplitude of the positive torque oscillation to zero in response to commands from the controller.

9. The method as claimed in claim 1, wherein an electrical angle between a d axis of the q-d coordinate axis system of the motor rotor and an exciting coil phase which is used by the controller to control the current component $I_q$ is determined without the use of a sensor.

10. The method as claimed in claim 1, wherein the motor shaft blockage is identified by the controller when at least one of a motor coil current and the current component $I_q$ in the q direction is equal to or greater than at least one of a predetermined maximum current value, and/or a difference in an electrical angle between a d axis of the q-d coordinate axis system of the motor rotor and an exciting coil phase is less than or equal to a predetermined threshold valve in two successive electrical angle determinations.

11. An electric motor, comprising:
    a synchronous motor or an asynchronous motor; and,
    a controller configured to control the synchronous motor or the asynchronous motor in accordance with the method of claim 1.

12. A pump, comprising:
    a synchronous motor or an asynchronous motor;
    a motor-driven pump coupled to an electric motor; and
    a controller configured to control the electric motor in accordance with the method of claim 1.

13. The pump as claimed in claim 12, wherein the motor-driven pump is a centrifugal pump.

* * * * *